(12) United States Patent
Lamy-Bergot et al.

(10) Patent No.: US 8,798,144 B2
(45) Date of Patent: Aug. 5, 2014

(54) SYSTEM AND METHOD FOR DETERMINING ENCODING PARAMETERS

(75) Inventors: Catherine Lamy-Bergot, Paris (FR); Benjamin Gadat, Rueil Malmaison (FR)

(73) Assignee: Thales, Neuilly sur Seine (FR)

( * ) Notice: Subject to any disclaimer, the term of this patent is extended or adjusted under 35 U.S.C. 154(b) by 505 days.

(21) Appl. No.: 13/122,568

(22) PCT Filed: Oct. 5, 2009

(86) PCT No.: PCT/EP2009/062905
§ 371 (c)(1),
(2), (4) Date: Jun. 8, 2011

(87) PCT Pub. No.: WO2010/040715
PCT Pub. Date: Apr. 15, 2010

(65) Prior Publication Data
US 2011/0268187 A1   Nov. 3, 2011

(30) Foreign Application Priority Data
Oct. 6, 2008  (FR) ...................................... 08 05513

(51) Int. Cl.
*H04N 7/26* (2006.01)
(52) U.S. Cl.
CPC ...................................... *H04N 7/26* (2013.01)
USPC .................................................. 375/240.07
(58) Field of Classification Search
CPC ....................................................... H04N 7/26
USPC ..................................... 375/240.07; 709/231
IPC ....................................................... H04N 7/26
See application file for complete search history.

(56) References Cited

U.S. PATENT DOCUMENTS

2007/0288651 A1*  12/2007  Nassor et al. .................. 709/231

FOREIGN PATENT DOCUMENTS

| FR | 2862168 | A | 5/2005 |
| FR | 2903253 | A1 | 1/2008 |
| FR | 2903272 | A | 1/2008 |
| WO | 2006/067375 | A | 6/2006 |
| WO | 2006/099082 | A | 9/2006 |
| WO | 2007/090176 | A | 8/2007 |

OTHER PUBLICATIONS

Cyril Bergeron et al., "Modelling H.264/AVC sensitivity for error protection in wireless transmissions", THALES Land and Joint Systems, EDS/SPM, F-92704 Colombes Cedex, pp. 1-4.

(Continued)

*Primary Examiner* — Jay Patel
*Assistant Examiner* — Neil Mikeska
(74) *Attorney, Agent, or Firm* — Baker & Hostetler LLP

(57) ABSTRACT

A method for optimizing a video transmission, in a constrained environment using a video coder adapted for coding the video data to be transmitted, includes determining one or more compression parameters for the video coder considered to transmit the video data at a given throughput or for a given quality. The method defines and uses reference charts for the coder considered, and predicts for the part of the video sequence undergoing compression, using the reference charts, compression parameters to be used, such as the quantization interval, by selecting a chart for which the targeted range of throughput or of quality is the closest in distance to the part of the sequence to be compressed, while complying with a given margin, and updates with an iterative method the prediction step to converge on the best choice of parameterization. The iteration includes at least one compression step followed by a verification step, to compress the video data to be transmitted with the parameters.

12 Claims, 13 Drawing Sheets

(56) References Cited

OTHER PUBLICATIONS

Joachim Hagenauer, Rate-Compatible Punctured Convolutional Codes (RCPC Codes) and their Applications, IEEE Transactions on Communications, vol. 36, No. 4, 1988, pp. 389-400.

C. Bergeron et al., "Temporal scalability through adaptive M-band filter banks for robust H264/MPEG-4 AVC video coding" Thales Communications, EDS/SPM, Colombes, France, pp. 1-9.

Cyril Bergeron et al., "Compliant selective encryption for H.264/AVC video streams", THALES Communications Colombes, France, pp. 1-4.

M.G. Martini et al., "Content Adaptive Network Aware Joint Optimization of Wireless Video Transmission", Oct. 31, 2006, pp. 1-16.

International Telecommunication Union, "Advanced video coding for generic audiovisual services", ITU-T Recommendation H.264 was approved by ITU-T Study Group 16 (2001-2004) under the ITU-T Recommendation A.8 procedure on May 30, 2003, pp. 1-282.

Ding, W., et al.: "Rate Control of MPEG Video Coding and Recording by Rate-Quantization Modeling," IEEE Transactions on Circuits and Systems for Video Technology, IEEE Service Center, Piscataway, NJ, US, vo 1. 6, No. 1, Feb. 1, 1996, pp. 12-20, XP000625575.

Mitchell, J., et al.: "MPEG Video compression standard," MPEG Video Compression Standard; [Chapman and Hall Digital Multimedia Standards Series], New York, Chapman and Hall, US, Jan. 1, 1996, pp. 340-356, XP002115299.

Jia, Zhike, et al.: "Adaptive quantization scheme for very low bit rate video coding," Asia-Pacific Conference on Communications and Optoelectronics andCommunications Conference. APCC/OECC Proceedings, vol. 2, Oct. 18, 1999, pp. 940-943, XP002443906.

\* cited by examiner

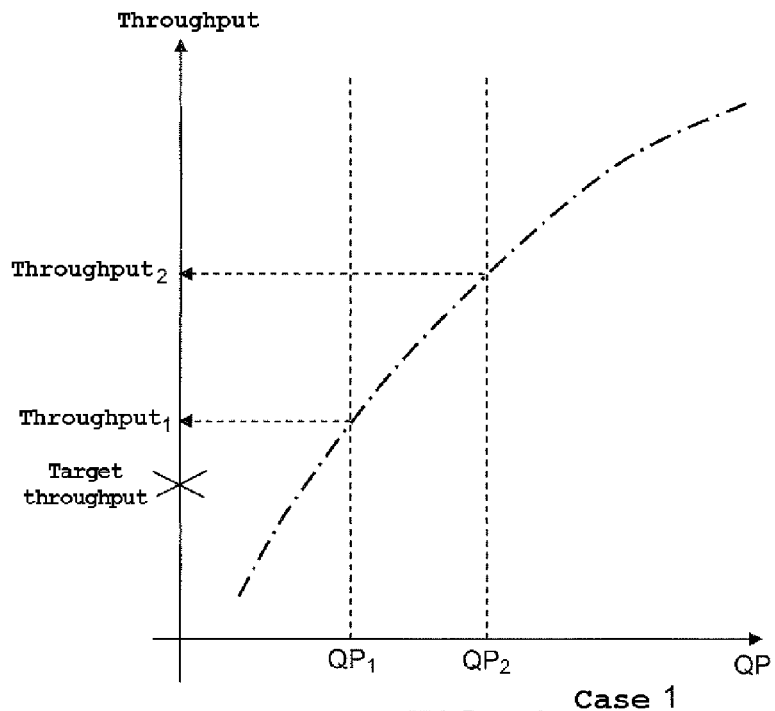
FIG.5A Case 1
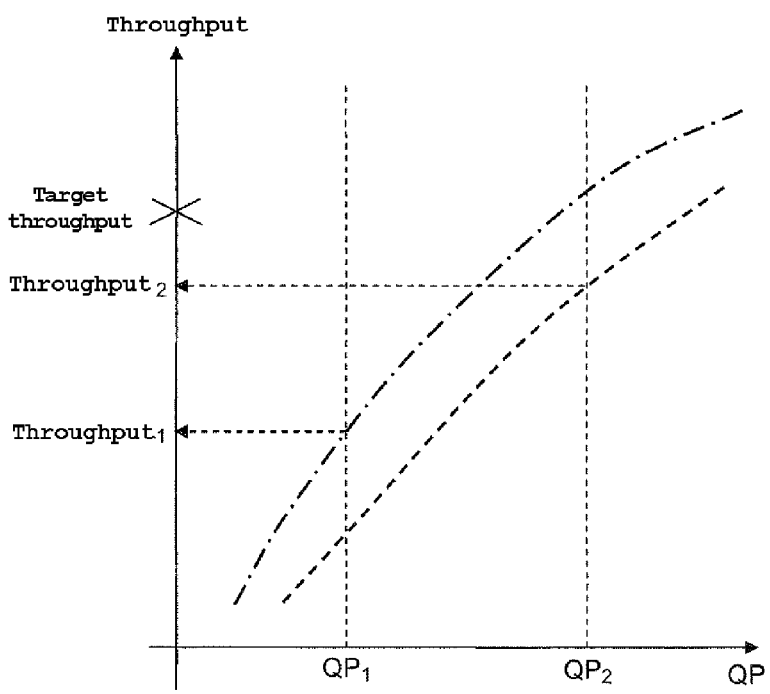
FIG.5B Case 1

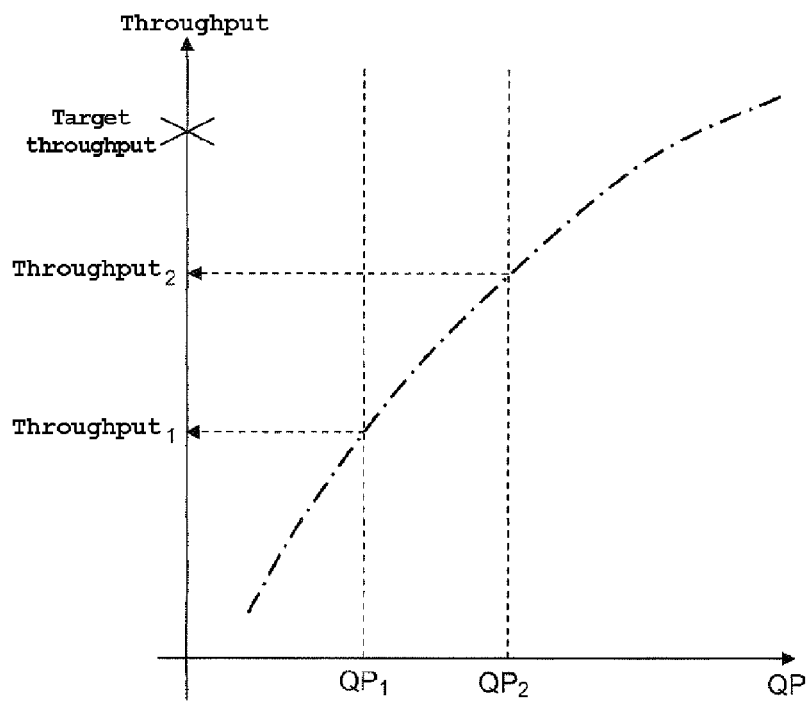
FIG.5C Case 2
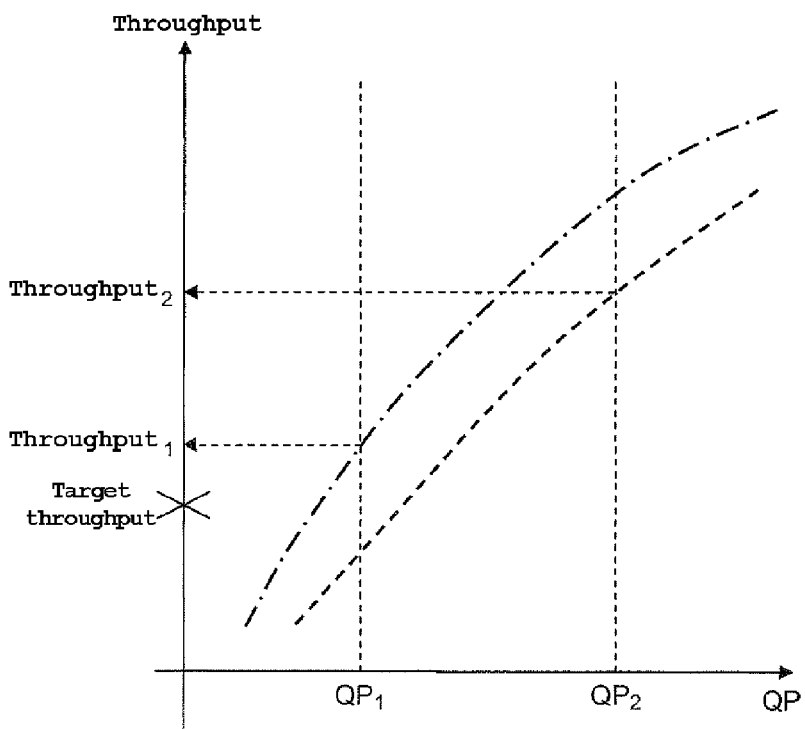
FIG.5D Case 2

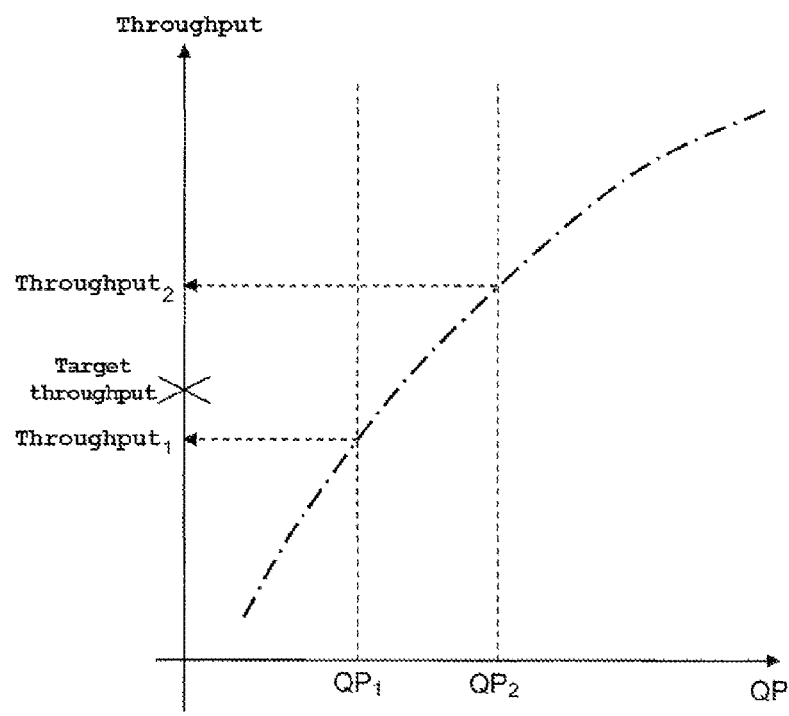
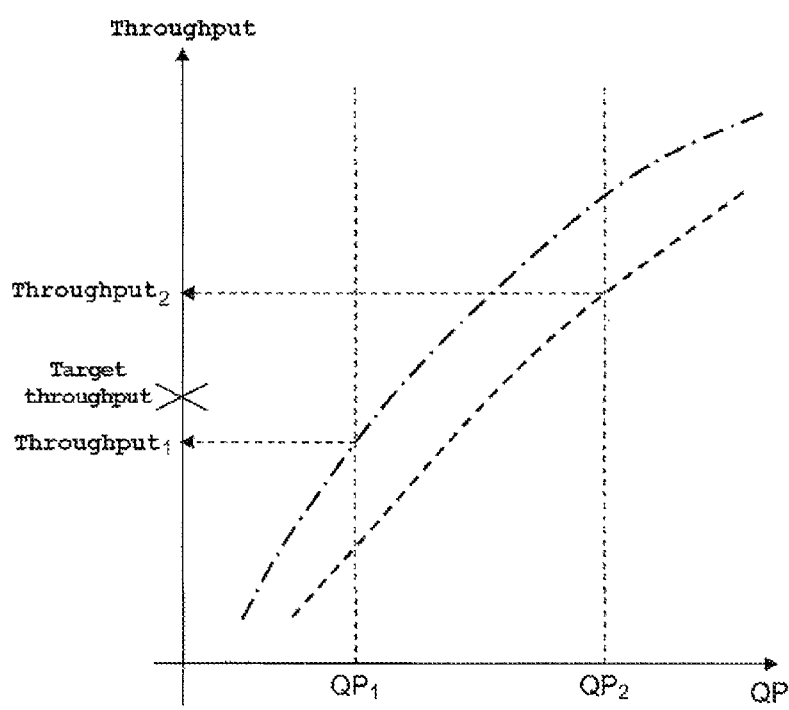
FIG.6

SYSTEM AND METHOD FOR DETERMINING ENCODING PARAMETERS

CROSS-REFERENCE TO RELATED APPLICATIONS

This application is a National Stage of International patent application PCT/EP2009/062905, filed on Oct. 5, 2009, which claims priority to foreign French patent application No. FR 08 05513, filed on Oct. 6, 2008, the disclosures of which are incorporated by reference in their entirety.

FIELD OF THE INVENTION

The invention relates notably to a tool for supervising and determining the coding parameters for allocating available throughput between an operation of source coding and an operation of protection by addition of error-correcting coding, called for the sake of simplification joint controller, making it possible to allocate effectively and in a realistic manner the available throughput during the transmission of data between on the one hand the compression (source coding of the video datum) and on the other hand the addition of protection (channel coding or insertion of redundancy) for video data that may take the form of images or frames or else of a grouping of images, better known by the abbreviation GOP (Group Of Pictures).

The architecture proposed according to the invention lies notably in the realm of joint coding, where information regarding the quality of the transmission channel (whether involving a throughput, an error rate, a loss rate, etc.) allows the installation of a strategy for optimizing the video datum transmitted so as to cope with the estimated transmission channel, in order to obtain at receiver level a better quality of video image perceived by the user.

The invention finds its application notably at the level of a video data server, acting as an intelligent broadcasting pump which will control the compression and protection levels introduced to improve the mean quality received, doing so as a function of the information about the transmission conditions received.

In the description, the expression "constrained environment" corresponds to conditions of transmission of video data through a channel with errors or losses and also to the fact that the throughput is not unlimited (existence of a limitation or constraint on maximum throughput). The notion of working point or operating point of a system refers to the transmission conditions for which the adjustment of the system is performed.

BACKGROUND OF THE INVENTION

The methods generally implemented in the prior art for offering optimized joint coding so as to effectively carry out available throughput allocation between on the one hand the compression and on the other hand the addition of protection rely mainly on:

The separation theorem (established by Shannon) which says that independent optimization of each of the elements of the transmission chain is sufficient;

The installation of optional solutions of tandem coding, that is to say, the concatenation of source coder and channel coder, for one or more pre-established operating points. This second approach presents the drawback of being static in the sense that it does not make it possible to adapt to variations in the transmission conditions.

In general, the methods and devices according to the prior art do not make it possible to rapidly adapt to variations in the transmission conditions which are often frequent in the course of a wireless transmission. The adaptation is generally done for a given operating point, typically corresponding to a permitted/available mean throughput for a rate of losses or residual errors undergone by the stream transmitted. Moreover, the approach of separation into protocol layers introduced by the OSI model well known to the person skilled in the art leads to the favoring of an approach without inter-layer communication, thereby requiring each lower layer to operate perfectly (without losses or errors) which is generally not effective in the case of multimedia transmissions and which in contradistinction to non-multimedia data transmissions can accept errors. When the transmission conditions are better than the operating point adopted, a part of the available throughput is unnecessarily allocated to the protection of the stream transmitted, whereas it could either be spared, or be used to send at a higher useful throughput. Conversely, when the transmission conditions are worse than the operating point adopted, too large a part of the throughput is employed by the unprotected useful datum, thereby leading to inevitable losses in reception, that is to say a part of the data may not be protected since the throughput allocation for protection turns out to be insufficient in practice.

SUMMARY OF THE INVENTION

The idea of the invention relies on a new approach making it possible to optimize the use of the resources (radio in particular) used and making it possible, by comparison with the case suitable for a fixed operating point, either to provide an increase in the quality perceived by the end user for similar use of the resources or to use only a part of the available resources while providing identical perceived quality. That is to say that there is a gain obtained either by using less band for the same perceived quality, or by obtaining better quality by using the band allocated initially, with respect to the case uncontrolled according to the invention.

The object of the invention is to propose a method and a device which no longer work solely on the actual videos to be compressed. The method implements reference files or charts used as behavior models of the coder and an iteration loop which makes it possible to adapt the prediction to the video sequence undergoing processing. The proposed approach is valid for any coder and for any standard currently existing in the field of coding, by performing a change of charts. The invention also offers additional functionalities. Thus, the device according to the invention can not only perform throughput prediction subsequent to compression, but also determine the optimal ratio between the throughput allocated to the compressed datum and that allocated to the insertion of a corrector coding in the case where the operating point of the system involves the presence of losses or errors caused by transmission.

In the subsequent description, the expression "reference videos" relates to all the references which are used to create the charts and which are files provided, for example, by the ITU-T as common reference for the whole of the video processing community so as to carry out tests. For example, the 'Foreman' sequence is the best known and the most used in this technical field.

The subject of the present invention relates to a method for optimizing a video transmission in a constrained environment comprising a video coder adapted for coding the video data to be transmitted, characterized in that it comprises at least one step of determining one or more compression parameters for the video coder considered so as to transmit said video data at a given throughput Di or for a given quality Qi by executing at least the following steps:

define and use reference charts for said coder considered, predict for the part of the video sequence undergoing compression, and by means of said reference charts, compression parameters to be used, at least the quantization interval QP, by selecting a chart in the (QP, throughput) or (QP, PSNR) representation which for the targeted range of throughput Di or of quality Qi, is the closest in distance to said part of the sequence to be compressed, while complying with a given margin, update with an iterative method the prediction step so as to converge on the best choice of parametrization, said iteration method being composed of at least one compression step followed by a verification step, compress the video data to be transmitted with said parameters.

According to one embodiment, the method comprises a step of protecting against transmission errors, the protection parameters being determined by taking account of the data transmission channel and of the compression parameters.

The invention also relates to a system for optimizing a video transmission in a constrained environment comprising a video coder adapted for coding the video data to be transmitted, the data being transmitted via an optionally non-perfect communication channel, characterized in that it comprises at least one coder provided with a processor suitable for executing the steps of the method according to the invention.

BRIEF DESCRIPTION OF THE DRAWINGS

Other characteristics and advantages of the present invention will become better apparent from reading the description of an exemplary embodiment given by way of wholly non-limiting illustration accompanied by the figures which represent.

DETAILED DESCRIPTION

To better elucidate the idea implemented by the invention, the example which follows by way of nonlimiting illustration thereof calls upon reference videos, which are those used to create charts and which are files provided by the ITU-T as common test reference for the whole of the video processing community. For example, the 'Foreman' sequence which is used in the example is the best known. The charts can also, without departing from the scope of the invention, be constructed on the basis of a collection of sequences representative of the type of data corresponding to the scenario of the system installed.

These reference charts are determined in advance once and for all. They are carried out, preferably, on the video coder that will actually be used in the system, so that the prediction is of good quality.

The elements entering into the present description are either the sequence that one seeks to transmit which may be an arbitrary sequence, or the reference sequences which will have served, beforehand and once and for all, to establish charts.

It is the use of these various charts constructed on the basis of reference video files or extracted from typical sequences of the application considered which, by virtue of the prediction loop introduced into the method according to the invention, makes it possible notably to precisely predict the parameters to be used to obtain a target video quality and a target throughput, and to do so even when working on a non-perfect channel, and therefore faced with losses or errors against which will be added the prediction of the level of protection to be applied.

Without departing from the scope of the invention the method may be used at the level of a video data server, acting as an intelligent broadcasting pump which will control the levels and the modes (e.g. choice of packetization, type of coding, etc.) of compression and protection introduced, so as to improve the mean quality received, doing so as a function of the information about the transmission conditions received.

Figure 1:
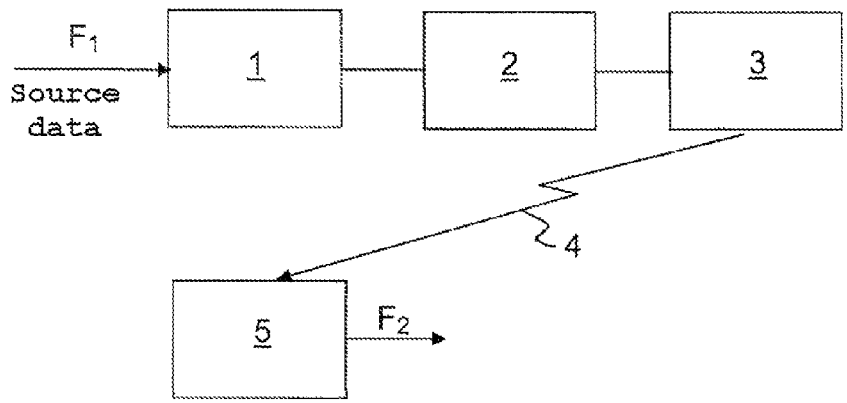
FIG. 1, a diagram representative of an exemplary system according to the invention, FIG. 2, the principle of a first type of chart representing the video quality as a function of the quantization intervals, FIG. 3, the principle of a second type of chart showing diagrammatically the throughput expressed as a function of the quantization intervals, FIG. 4, a way of selecting a quantization interval for a reference chart, FIGS. 5A, 5B, 5C and 5D, a refinement of the choice of quantization interval to be used when several quantization parameters may be used, FIG. 6, two examples of refinement of the choice of the quantization interval to be used when several quantization parameters are candidates, FIG. 7, the illustration of the impact of the loss of frames in a GOP; distortions corresponding to frame losses or PSNR on partial GOP, FIG. 8, a flowchart showing the steps executed in the "total" mode, FIG. 9, a flowchart showing the steps executed for the "partial and trials" mode, FIG. 10, a flowchart describing the steps executed for the "blind" mode, FIG. 11, an example of the evolution of the PSNR with time for the "total" mode and in the non-adaptive case for a target throughput of 180 kbps and a variable signal-to-noise ratio on the wireless channel ('Foreman', ITU-T video sequence, QCIF 15 Hz, first 17 GOPs), FIG. 12, an example of the evolution of the PSNR with time for the "partial and trials" mode in the non-adaptive case, for a target throughput of 180 kbps and a variable signal-to-noise ratio on the wireless channel ('Foreman' ITU-T video sequence, QCIF 15 Hz, first 17 GOPs), FIG. 13, a collection of charts plotting the PSNR as a function of the throughput obtained for video sequences in the PSNR 15-Hz QCIF format, FIG. 14, a collection of charts plotting the throughput as a function of the QP obtained for video sequences in the 15-Hz QCIF format, FIG. 15, a collection of charts plotting the Intra function in the throughput of the GOP as a function of the total throughput obtained for video sequences in the 15-Hz QCIF format, FIG. 16, a collection of charts plotting the Intra fraction in the throughput of the GOP as a function of the PSNR obtained for video sequences in the 15-Hz QCIF format, and FIG. 17, an exemplary estimation of PSNR, a comparison of the experimental results with the prediction obtained by virtue of the charts ($1^{st}$ GOP of the 'Foreman' ITU-T reference sequence in the 15-Hz QCIF format).

FIG. 1 shows diagrammatically an exemplary transmission device, in which the method and the tool according to the invention may be implemented. Such a device will comprise a source coder 1, receiving the data or the stream of data $F_1$, and suitable for carrying out the compression operation, optionally a processor 2 making it possible to implement an error-correcting coding, and a processor 3 suitable for executing the steps according to the invention, a transmission channel 4 which may be a physical linkup or a wireless transmission medium, a receiver 5 having notably a function of decoding the data or the video sequence having traveled through the transmission channel and generating a stream $F_2$. The device also comprises means for storing one or more charts of video sequences, as well as tables or charts containing the throughputs and the video quality to be applied to a data sequence. The word "controller" will be used in the description to designate the processor implementing the steps of the method.

At least two hardware configurations are conceivable: a computer carrying out the coding operation via software, this software then being in fact controlled by a controller/supervisor choosing the parameters or a video compression card, which must also integrate a processor hosting the software part of the controller/supervisor.

The steps of sending, receiving and transmitting video data, being known to the person skilled in the art, will not be described in this document. Only the steps constituting the originality of the method and of its tool according to the invention making it possible to allocate an available throughput between on the one hand the source coding of the video datum to be transmitted and on the other hand the addition of protection to these data so as to combat transmission errors will be detailed.

The constraints on the optimization method are given in terms of throughput or of hoped-for video quality, that is to say a level of quality estimated by an objective measure, the aim of which is to represent human vision. In practice, by comparing with a non-optimized case (for which the parameters of the device are fixed at default values), this corresponds to making good use of the resources (radio in particular) used and making it possible either to provide an increase in the quality perceived by the end user for a similar use of the resources or to use only a part of the available resources while providing identical perceived quality.

In the example taken to illustrate the present patent application, the measure used to estimate the perceived quality is, for example, the PSNR, the acronym standing for Peak Signal to Noise Ratio, which is an objective measure of distortion used in digital images, most particularly in image compression. It is defined by:

$$PSNR = 10 \log_{10}\left(\frac{255^2}{MSE}\right)$$

where $$MSE = \sum_{i=1}^{M} \sum_{j=1}^{Q} \frac{(pl^*(i,j) - pl(i,j))^2}{M \times Q}, M, Q$$

are the dimensions (width and height) of the video images, and pl(i,j)(pl*)

gives the luminance of the pixel at original (or reconstructed) position (i,j) in the image.

In order to illustrate the method and the implementation tool, the description will now detail three modes of implementation making it possible to cover a significant number of scenarios. These modes are given only by way of illustration and to enable the reader to better understand the invention.

Principle

The parameters to be taken into consideration will be dependent on the application, that is to say on the constraints to be taken into account for the implementation of an application of multimedia type (where the video and audio parts are for example multiplexed) or of streams of video data alone, and of the information available for the optimization to be carried out. These various conditions, including in particular the complexity and real-time operating constraints (depending on whether there is a small or large lag, and according to the throughput to be delivered) but also the operating life of the video itself (going from the prerecorded stream which may be regularly downloaded for real-time transmission carried out just once), will require various practical strategies for the optimization method according to the invention.

By carefully considering the various modes of operation which may be discriminated, it is possible to distinguish three main cases: going from the optimal (from a control point of view) case where the a priori knowledge about the multimedia data stream to be transmitted is complete, to the case where certain information about the stream is known but for which the temporal constraints will allow the controller or device according to the invention to test a few configurations before deciding on the parameters to be used, to the most difficult case where the controller must immediately decide on the parameters to be used while having only limited knowledge of the past configurations.

In practice, as a function of the scenario considered for an application, the best possible mode of operation is selected and the choices of control/optimization are made as a function of this implementation of the invention.

1—"Total" Mode

This term is adopted for the case where the controller, which is the mechanism controlling and directing the operation of the source coder, has total knowledge of the sequence of the data to transmit the information. For example, in the case of a video data server, it will be possible to store various compressed versions of a sequence at different throughputs and/or resolutions of the same original sequence, or simply it will be possible to store the sequence slightly compressed or uncompressed as well as a table or chart containing precisely the throughputs and video quality expected for a set of compression parameters to be applied to the sequence. More generally, the expression "knowledge of the sequence" is therefore understood to mean the fact of knowing the throughput obtained for various coding configurations (quantization parameter, spatial resolution, temporal resolution, etc.) but also the relative proportions of the various parts of the stream (intra frame I, predicted frame P, etc.) for these various configurations. This mode is realistic when considering stored broadcasting sequences, a term better known by the name "streaming/broadcasting" which may for example have been pre-coded with different throughputs, and for which the controller will simply be able to choose the best suited for transmission on the channel at a time t.

2—"Partial and Trials" Mode

This case corresponds to a mode for which the control mechanisms will have a basic knowledge about the video coding itself. Typically the knowledge relies on the charts providing statistical information about the throughputs and the curves of video quality for given compression parameters (quantization parameter, spatial resolution, temporal resolution, etc.) and uses an approach relying on one or more trials to reach the optimal operating point. Naturally, only a limited number of tests has to be considered; typically a set of three tests may be considered. This mode is realistic when considering streams with limited constraints on lags, i.e. when the execution time necessary to execute the encoding method more than once is acceptable, and when the statistical information has been predetermined for the standard or the video coder considered.

3—"Blind" Mode

This mode corresponds to the case where the control mechanism according to the invention has to work without complete knowledge of the forthcoming stream, or without the possibility of testing several configurations before having to choose the use of one of them. Notably having knowledge of the coding parameters for the previous GOP, the blind mode is the least effective but also the simplest and the fastest to implement. It will rely largely either on the use of default parameters (in particular at the start of a sequence) or on the parameters of the previous moments in order to determine the best coding parameters to be used at a given instant t. This mode corresponds to solutions of low real-time complexity and it is particularly suitable for a real-time data stream such as a video conference.

In all the aforementioned cases, the control method will result in the decision on the best choices of parameters for the compression of the data and optionally of addition-of-protection parameters for the throughput conditions and transmission conditions available (state of the network and/or information about the state of the channel).

For the "partial and trials" modes and the "blind" mode, a second adaptation step may be executed so as to ensure that the target throughput is complied with. This post-processing step will be applied, for example, by deleting a number of frames or packets which, if they were retained, would lead to an exaggerated overshooting of the target throughput. This cutting operation is used only when necessary, an adaptation margin being defined (5 to 10% of overshoot possibly being declared acceptable). In practice it will often be possible for this margin to be compensated on average over the duration of the sequence either by profiting from also having certain predictions conveying throughputs less than the target, or by fixing stricter constraints on the later parts of the video sequence when the overshoot becomes too big.

The description will now explain the tools and the steps implemented by the method according to the invention and by the supervision or control tool.

Tools and Functions for an Adaptation for a Spatial Definition and a Temporal Resolution The measures used for optimizing the transmission of the video data are: the quality of the video perceived on reception, or PQoS quality of service perceived by the end user.

As has been proposed in reference [2], the expression for the hoped-for average for the end-to-end distortion after the coding of the source, the packetization in the network, the channel coding operation, followed by the impact of the channel (modeled) and converse operations, may be used as a measure for comparing various realizations in the choices of compression/protection for the sequence to be transmitted.

So as to obtain enough data to operate, in particular in the case of an application with protection unequal to the errors, for which it is important to predict the relative proportions of each of the partitions, but to ensure that the prediction of the compression throughput operates and above all is averaged over several frames, the optimization proposed in what follows is executed on the basis of a throughput calculated group of images (GOP) by group of images. Without departing from the scope of the invention, it is of course understood that with minor modifications, the explanations which follow may apply in respect of images which are not constituted as a group of image but which arise under another format. More generally, the data may be audio data or video data. Thus, one possibility is to implement the method on a coder of MPEG-4 type.

Document [2] teaches that the "sensitivity" for a GOP made up of intra frames I followed by N predicted frames P is expressed by taking account of the fact that, in practice, the sensitivities of the P frames depend on the previous frames: if a P frame is not received correctly, then the following ones, even if they have been transmitted correctly, will not be reconstructed correctly. The term "sensitivity" for an image or a frame makes reference here to the measurement of the distortion introduced with respect to the uncompressed original video sequence in the case where the image or frame in question is lost or erroneous. In practice, the calculation of the sensitivity adopts the assumption that when a frame is lost, its partial distortion degrades the mean distortion of the GOP sufficiently for the contribution of the distortion of the following frames, if any, to become negligible. The impact of the previous frames which have not been correctly received is consequently taken into account by using a conditional probability on the previous frames to be corrected. This leads to the expression for the standard coded sequence in the $IP_N$ (Intra, Predicted) format for the mean distortion of a GOP $$\hat{D}_{gop} = \prod_{i=0}^{N} (1-P_e)^{\beta_i n_i} \cdot D_o + \sum_{i=0}^{N} \left[ \prod_{j=0}^{i-1} (1-P_e)^{\beta_j n_j} \cdot (1-(1-P_e)^{\beta_i n_i}) \cdot D_{loss_i} \right] \quad (1)$$

with $n_i$ the size of the $i^{th}$ P-frame, with $D_{loss_i}$ the distortion observed when the $i^{th}$ P-frame is lost although the previous frames are correct, with $D_o = D_{o_N}$ the mean distortion of the GOP without error, with $\beta_i$ the fraction of the frame which may be partially noisy without desynchronization of the stream and for a memory-less channel with a probability of error for the bit $P_e$.

With the experimental values estimated in [5] for the parameters $\beta_i$, i.e.: $1-\beta_0 \approx 0.25$ and $1-\beta_i \approx 0.15$), it is apparent that equation (1) can be utilized once we know, for all i, the values of the size of the $i^{th}$ P-frame $n_i$, the distortion observed when the $i^{th}$ P-frame is lost although the previous frames are correct $D_{loss_i}$ and finally the mean distortion of the GOP without error $D_o$.

Naturally, in the case where an error correction is introduced, the expression for the error probability $P_e$ will also have to be established. For example, the use of rate-compatible punctured convolutional codes (RCPC) on Gaussian channels with decoding with flexible inputs will enable us to use the bound on the error probability established in [6]:

$$P_e \leq \frac{1}{P} \sum_{d=d_{free}}^{\infty} a_d \cdot P_d$$

with $d_{free}$ the free distance of the code, $a_d$ the number of existing paths, $$P_d = \frac{1}{2}\text{erfc}\left(\sqrt{\frac{d \cdot E_S}{N_o}}\right)$$

the probability that an erroneous path at the distance d is selected when $SNR=E_S/N_0$.

Similar expressions can also be established [2] for a data partitioning or modes of frame mixing, which modes may in particular be used in the case where protection unequal to the errors is considered, such as that described in the Applicant's patent application FR 2 903 253.

Prediction of Throughput and of Quality for the Modes Other than the "Total" Mode Whereas for the "total" mode, the knowledge of the stream is perfect, and consequently all the values necessary for determining the quality of the metric are available, the "partial and trials" mode and the "blind" mode are causal and the future information is not available per se. In these last two modes, the statistical knowledge of the mode of video coding of the operation may be obtained, for example, via a set of charts, which will indicate, for a choice of temporal resolution and of spatial resolution (corresponding to the choice of format and tempo of the image) as well as for a given choice of compression, a prediction of the video quality obtained after reconstruction and the throughput obtained. Of course, it will also be possible to obtain the statistical knowledge from more theoretical approaches, but the principle remains the same.

For these last two modes, the representation of the statistics of the video coder will be more easily managed by using the compression parameter as reference parameter (in particular, the quantization interval (QP)) for the various possible temporal and spatial configurations.

Figure 2:
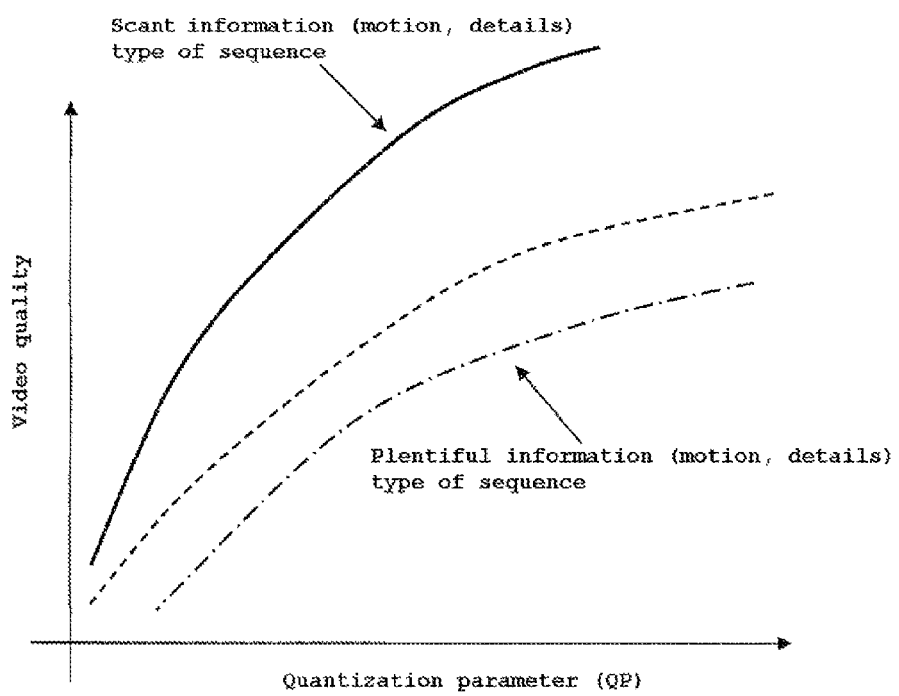

FIG. 2 illustrates the principle of the first set of charts, which give the information about the video quality as a function of the quantization parameter for various realizations of video stream.

Figure 3:
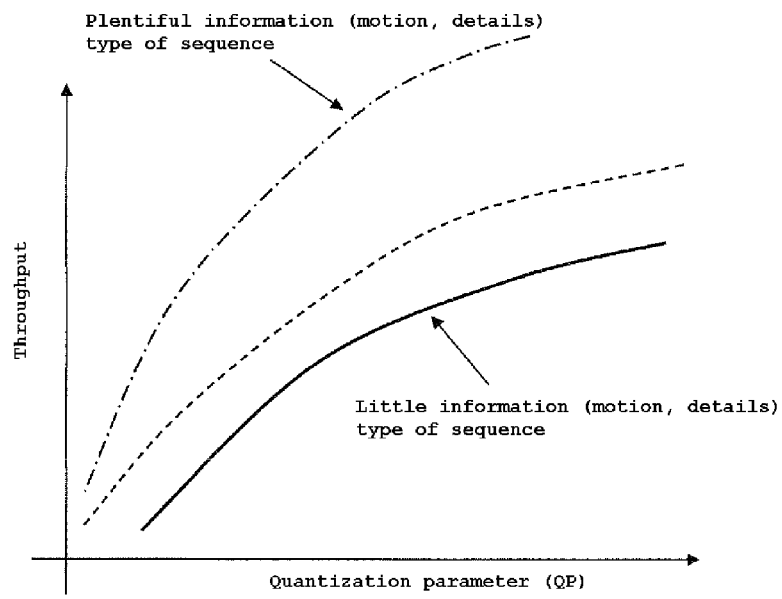

FIG. 3 illustrates the principle of the second set of charts, providing information about the throughput as a function of the quantization parameter for the same realizations of video stream.

It should be noted that the chart considered here can only be a two-dimensional chart if a predefined rule is established to relate the quantization parameters used for the various types of frame (for the standards offering potentially different quantization intervals according to the types of frames). Typically, in the tests performed, the following rules will be used:

$$\begin{cases} QP_I = QP \\ QP_P = QP+2 \\ QP_B = QP+2 \text{ (if used)} \end{cases}$$

for, respectively, the Intra frames, the predicted frames P and the bidirectional frames B.

These proposed rules rely on trials and simulations carried out to establish pertinent rules for the quantization, outside of the fact that the least significant frames ought to be quantized by using equal or larger quantization steps. Moreover, it has been established that the principles established remain valid for the other rules, equally well in the case where the non-predefined rules exist; in this case, the chart and the interpolation are not two-dimensional 2D but three-dimensional 3D or fourdimensional 4D (if a $QP_B$ exists and is different from the other QPs).

FIGS. 2 and 3 represent respectively the expression for the video quality as a function of the quantization parameter and the expression for the throughput as a function of the quantization parameter.

For any start point (default values, information for the previous GOP, etc.), these charts make it possible to establish the reference curve which will be used to determine the hoped-for throughput based on the possible quantization parameters QP and the corresponding hoped-for video quality.

The use of the curves in practice may be as follows:

Find the possible quantization parameter QP for a target throughput on an identified curve, For an identified curve, the chart is read and the best corresponding QP (the candidate closest on the chart) is selected for the trial. Although the chart pertains to a wide possible QP and throughput range, these values are not continuous, thus basically it is possible either:

1) to find a realization of the throughput that is close enough to the target throughput to comply with its definition to within the margin, 2) to not be in a position to select a candidate immediately.

Figure 4:
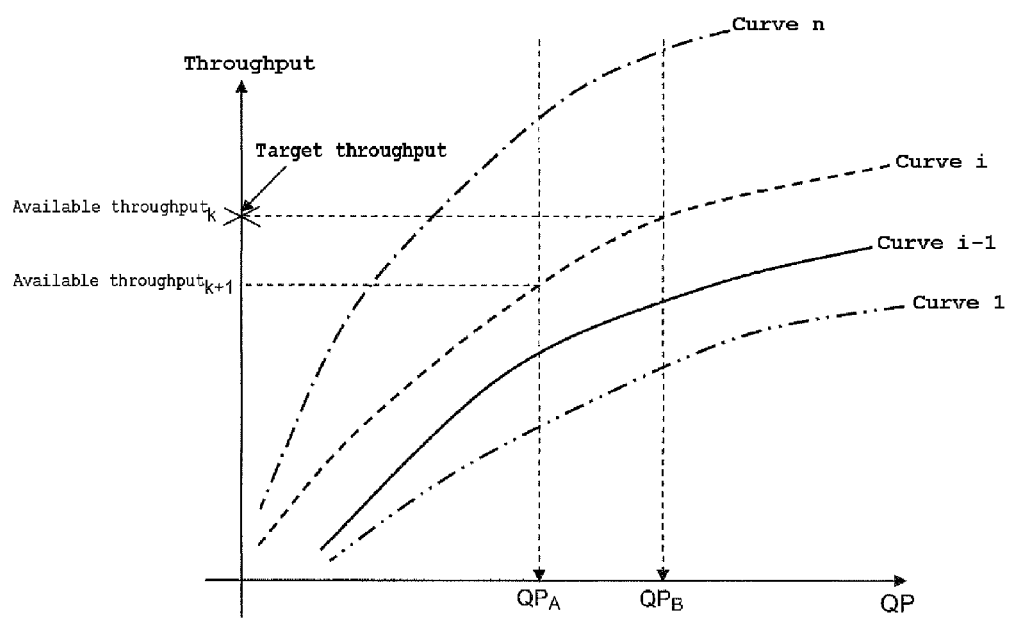

In the first case, illustrated by the candidate $QP_B$ in FIG. 4, the candidate $QP_{closest}$ is immediately selected and may be used for the encoding of the sequence. The candidate $QP_B$ is the candidate closest to the target throughput $D_{target}$ for chart I; in the present example, this corresponds to the target throughput.

In the other cases, a refinement step must be executed which is specified hereinbelow.

Refinement of the Selection of the Best Quantization Parameter QP

A refinement step may be necessary, either when it is not possible to find an intermediate candidate on the basis of the initial chart of the reading operation, or else when having executed several trials with the "partial and trials" algorithm, various pairs of realizations (throughput, QP) have been obtained on the basis of the trials on the current portion of the sequence. Several trials may be executed, which will allow more precise determination of the behavior of the portion (GOP) of the current sequence, typically if the choice of the initial prediction curve was not good. However, on account of the limited number of trials necessarily imposed by the real-time and practical-utilization constraints, the final choice of the quantization parameter QP will often have to be made without having found any QP that corresponds perfectly to the throughput or quality target, thus signifying that a choice must be made with only the knowledge available. Various cases may be envisaged which have been represented in FIGS. 5A, 5B, 5C, 5D and 6:

Case 1—all the QPs tested (on one or more curves) significantly exceed the target, Case 2—all the QPs tested (on one or more curves) come significantly below the target, Case 3—the throughput of the target is found between 2 QPs, found above a single curve, Case 4—the target throughput is found between 2 QPs, found above two different curves, For cases 1 and 2, various strategies, from the safest to the riskiest, may be implemented. These strategies correspond to a similar approach: either take the closest tested value and use it, or try with another, placing total confidence in the chart assumed to be the best.

Indeed, whereas at first sight it might be believed that the chart must immediately give the best QP, it should not be forgotten that the true problem is to determine, on the basis of the information of the previous GOPs, which chart corresponds best for the current GOP of the video sequence to be coded. A video sequence being able to change greatly from one moment to another (change of scene, large increase or decrease in the motion, new details introduced, etc.), the chart which is valid at a certain instant t may in fact turn out to be false at the next moment t+1, and therefore not allow good prediction.

In the subsequent description, an approach having a controlled risk level will be used:
  in case 1, use $QP_{theclosest}+1$
  in case 2, use $QP_{theclosest}-1$
  knowing that other adaptations may be considered; for example by choosing the increment as a function of the relative distance between the throughput attained with $QP_{theclosest}$ compared with the target throughput;
  in case 3, use a barycenter relation:

$$QP_{inf} + \frac{rate_{target} - rate_{inf}}{rate_{sup} - rate_{inf}} \times (QP_{sup} - QP_{inf})$$

where $rate_{target}$ is the target throughput, and for the two candidate pairs (QP1, throughput1) and (QP2, throughput2), $rate_{inf}$ represents the lowest throughput, $rate_{sup}$ the highest throughput, $QP_{inf}$ represents the lowest quantization interval and $QP_{sup}$ the highest interval;
  in case 4 which corresponds to the most difficult case, which in practice corresponds to a scenario where it has not been possible to determine the correct chart for the sequence having to be coded. Here again, the operation of calculating the barycenter proposed for case 3 is possible, but may turn out to be less effective if the optimal curve has a very different slope from the curve selected or else from the two curves selected. Another solution consists, for example, in inserting a third point (if it is available) into the interpolation: the three pairs (throughput, QP) being used to define a curve on which an interpolation may be performed directly. In the tests described hereinafter, it is the formula for the barycenter which will be used.

Estimation of the Length and of the Partial Distortion Information

Figure 7:
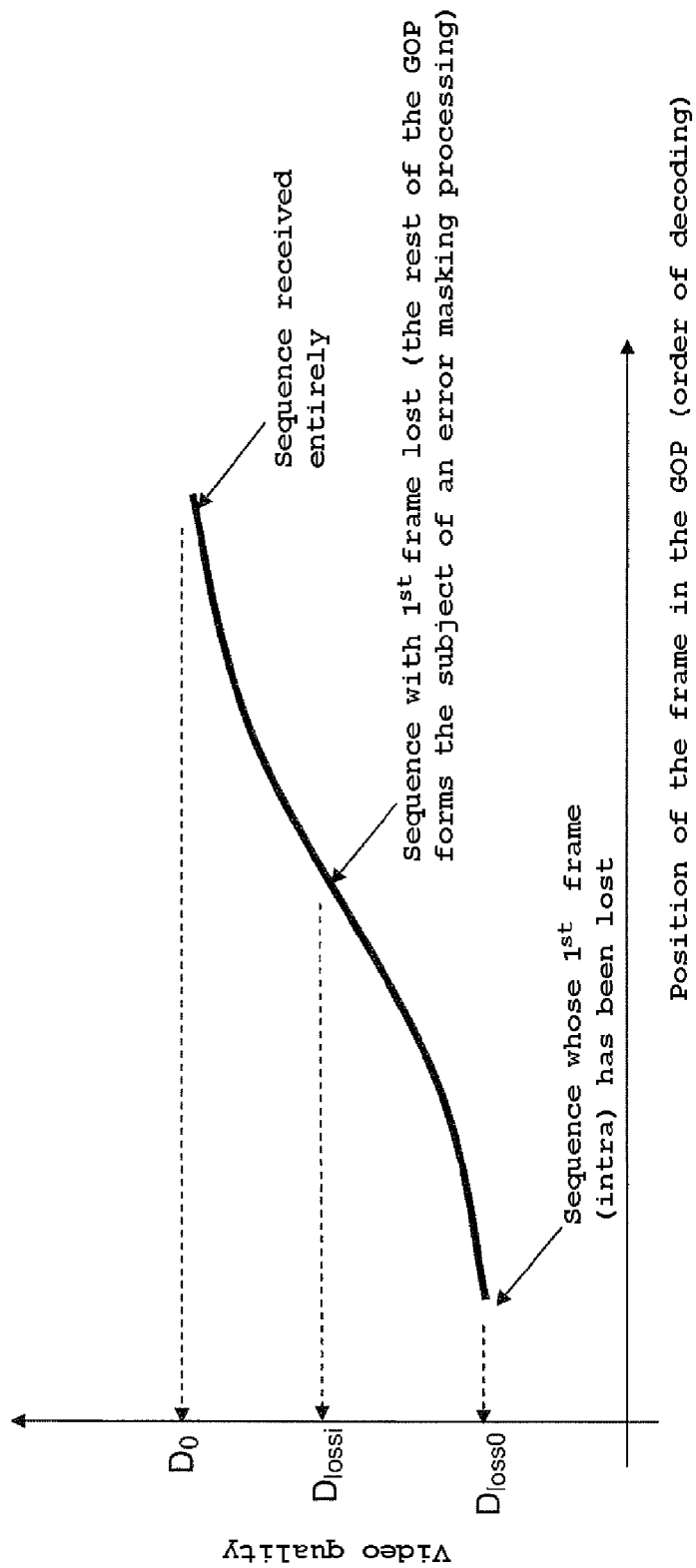
Figure 16:
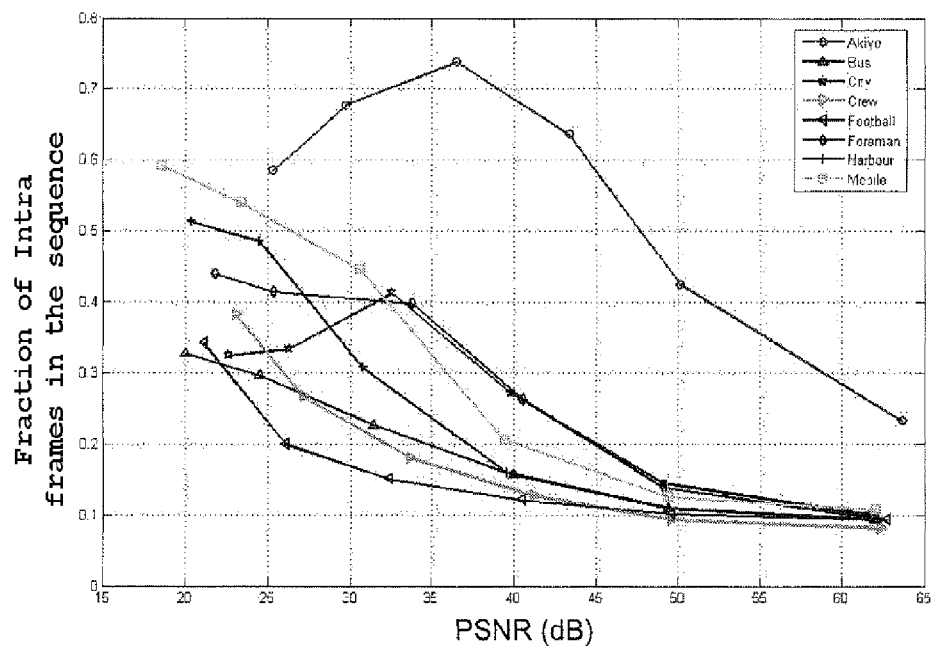
Figure 17:
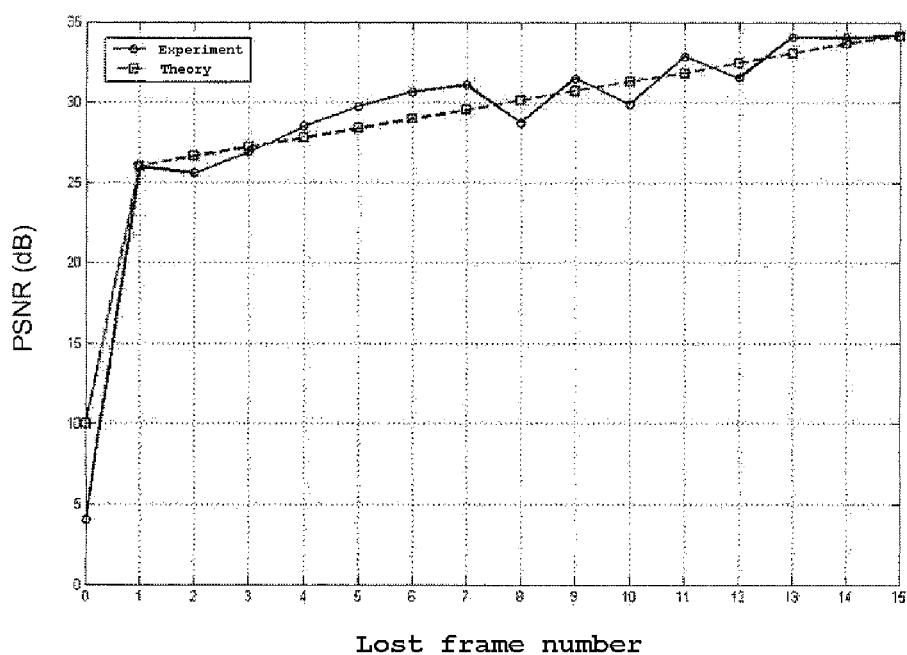

Having established the need to estimate the respective lengths of each frame ($n_i$), the distortion observed when the $i^{th}$ P-frame is lost ($D_{loss_i}$) and the distortion of the GOP ($D_o$), and having proposed the use of a chart to predict the throughput and the quality for the "partial and trials" and "blind" approaches, the subsequent description details how to obtain the missing information:
  $D_o$ (the distortion of the GOP) is easily known by virtue of the chart (type 1) since it involves the value of the PSNR of the GOP for the QP considered,
  The total length $l_{total}$ of the GOP is easily known by virtue of the chart (type 2) by simply dividing the throughput by the number of images per second. Indeed, the temporal resolution of the sequence is known for each chart.
  The Intra length $l_{Intra}$ is also known from the chart (type 2) as an additional item of information (the ratios for the intra/predicted are stored), as illustrated by FIGS. 16 and 17. In the exemplary implementation, the fraction is stored in addition to the chart information, as illustrated at the level of the aforementioned figures.
  The question which remains is to express the relative contribution for each frame in terms of length, that is to say $l_{P_i}$, and in terms of distortion, that is to say $D_{loss_i}$. As illustrated in FIG. 7, the partial quality (expressed in terms of partial distortion) is a function which increases with the number of decoded images. Pursuant to experimental observations (including the remarks made in reference [2]) the following expressions are proposed:

$$D_{loss_0} = \frac{1}{3}D_0,$$

$$D_{loss_i} = D_{loss_0} + \frac{i}{GOP_{size}} \times (D_0 - D_{loss_0}),$$

$$l_{P_i} = \frac{l_{total} - l_{Intra}}{GOP_{size} - 1}$$

Constraints Imposed and Definition of an Operating Margin

Having defined the parameters and the data, and how to obtain them, the description will now give the margins to be complied with.

Target Throughput

The concept of throughput control is not new, and numerous algorithms have been proposed in the video coding literature. Their common aim is to ensure that a given sequence attains a mean target throughput over the duration of the sequence, and their general approach is to react without abrupt change in spite of the quality of the limitations of the bandwidth and complex evolutions of the sequence.

The aim of the controller which will use the algorithm proposed in this patent is notably to be more reactive (in the sense of fast evolution so as to satisfy or attain the target throughput). Indeed, the conditions of the state of the channel may be hefty and impose hefty variations in the protection throughputs, which would introduce big imbalances in respect of the compressed sequence (too much throughput consumed or conversely too little) if the algorithms for slow adaptation of the throughput (such as those proposed in the H.264 reference coder) were expected to adapt to these variations.

Moreover, slow adaptation is valid only when the transmission or throughput conditions vary still more slowly, and always passes via an initial phase with very inappropriate parameters. In the case of a wireless transmission on a variable channel, including when the residual error rate is negligible and the problem of introducing protection does not arise, such an approach risks providing very bad results.

Adaptation to a Variable Sequence: Definition of the Acceptable Margin

Having established the importance of carrying out relatively regular throughput control, it is also important to recall that margins must be defined so as to avoid having to apply too strict or too frequent post processings (as will be detailed hereinafter). In practice, a tolerance margin of 10% will be used, which has been employed successfully in the experiments conducted by the Applicant, some examples of which are given further on in the description and illustrated in FIGS. 11 to 17.

It is recommended that, together with this margin, an observation algorithm be implemented which notes the real throughput used with respect to the target throughput, and which will thereafter be capable of updating the target throughput as a function of past reality. Typically, if a throughput used for a certain time span is too low, the target throughput for the next GOPs could be increased or conversely reduced in the case where the throughput actually used previously would be too large. In the case where the control algorithm is aimed at a target quality and no longer at a target throughput, this algorithm for observing the throughput used would also make sense, since quality-oriented practical applications nevertheless in general have a constraint of maximum throughput not to be exceeded.

A pertinent remark considering the definition of the margin and rules for a possible improvement of the video quality perceived by the user could be to recommend, when various candidate QPs are found to be equivalent by the joint controller, selection of the one which is closest (ideally which is equal) to the last one used, so as to limit the possible effects of flicker when the quantization varies too often.

Post-Processing Operations (For the "Partial and Trials" and "Blind" Modes)

Having chosen the parameters to be used for the coding operations (compression, protection), the coding is carried out, but it may turn out that the constraints are not satisfied. Typically, in spite of the efforts made, an overshoot of throughput exceeding the acceptable margin may occur. To limit the impact of such prediction errors, a post processing operation is proposed, which will correspond to cutting off the last frame or frames (having the least impact on the sequence).

This post processing may be done in a manner particular to the level of the coder, typically leading for the H.264/AVC coder to the insertion of artificially empty frames (all the macro-blocks being predicted a zero difference with their reference, for example) and this will allow the decoder to receive the right number of frames, even if it does not have the initial information that they contained. There will then be no risk of desynchronization occurring.

Another specific post-processing operation is envisaged when the operating conditions are difficult. In practice, it may often be observed that when the permitted total throughput is reduced, the parameter selection obtained leads, for bad transmission conditions, to a choice of very hefty compression, therefore to sequences with very little useful information which are nevertheless at high risk of arriving corrupted at reception. Therefore, it is proposed that a threshold $PSNR_{mini}$ be defined, below which transmission will not be attempted, except optionally a few pilot symbols (to maintain the connection, to obtain information about the state of the channel, etc.).

This approach will make it possible to recover band which may consequently be available for future periods by virtue of the approach of observation and control of the mean throughput.

Having introduced the tools mentioned previously, the 3 modes of operation can now be defined precisely and their diagram devised.

Total Mode Method

As was mentioned hereinabove, the "total" method corresponds to the selecting of the best pair (compression, protection) as a function of the feedback information (channel state, available band, etc.) available.

Figure 8:
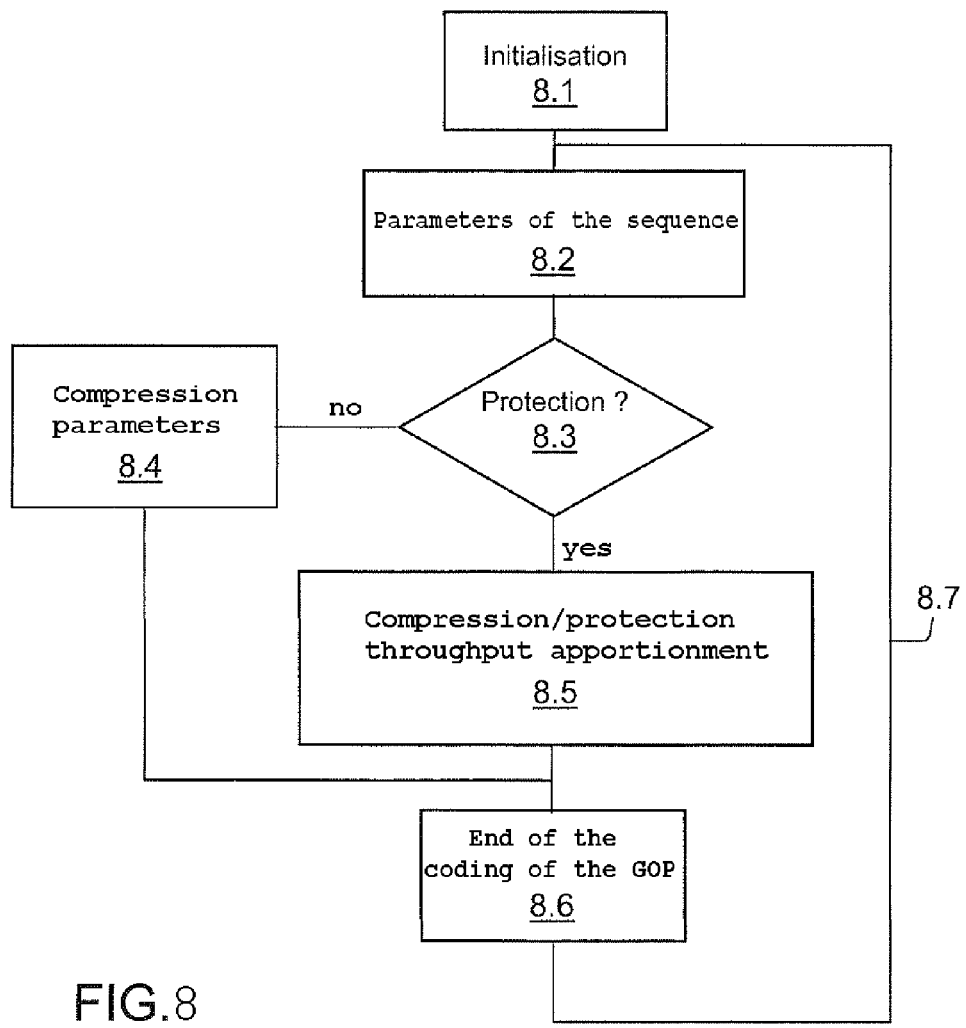

FIG. 8 presents the complete flowchart of this mode of operation.

Step 8.1 Initialization:

Take the default values for the compression parameters and the feedback information about the state of the transmission Step 8.2 Parameters of the Sequence:

Read for each available realization of the incoming GOP the information (throughput, QP) so as to obtain the accurate real curve (C) of throughput for the next GOP of the current sequence.

Step 8.3 does Protection Need to be Introduced at the Application Level?

NO

Step 8.4 Compression Parameters:

As a function of the available throughput, select the pair (throughput, QP) on the curve (C) which best corresponds to the throughput and video quality constraints.

Select the corresponding parameters and trigger the coding method.

YES

Step 8.5 Compression/Protection Throughput Apportionment:

For each degree of protection, select a collection (S) of pairs (throughput, QP) on the curve (C) making it possible to comply with the throughput constraints.

For each element of (S), predict the length of the GOP and the distortions corresponding to the frame losses (Dloss) and deduce therefrom the video measure, estimated on reception, of the $PSNR_{gop}$ of the GOP, compare this value with the best current value PSNR.

Select the best $PSNR_{gop}$ and trigger the method for coding the data with the corresponding coding parameters (compression, protection).

Step 8.6 End of the Coding of the GOP:

Send the packets generated

Store the real current value of the pair (throughput, QP) in the list of previous pairs (throughput, QP)

If there is any, read the new feedback information about the state of the transmission.

Step 8.7 Control Operation for the Next GOP

"Partial and Trials" Mode

The "partial and trials" mode is used when a multi-trial approach may be used, although limited to a certain number of cases. The performance of the algorithm and therefore the relevance of the choices of parameters and the final performance naturally depend on the number of trials permitted, which we propose to limit to three tests in our simulations.

In practice, the complexity of the coding is multiplied by this number of trials. So as to limit the complexity it is recommended that each result of the coding method be stored and that the selected result be used if the choice of the final coding is one of the previous trials. Moreover, if one of the tests (including the first) offers a result within the constraints fixed, it is recommended that it be selected and that the coding process be run with the parameters in question, without doing more trials.

Figure 9:
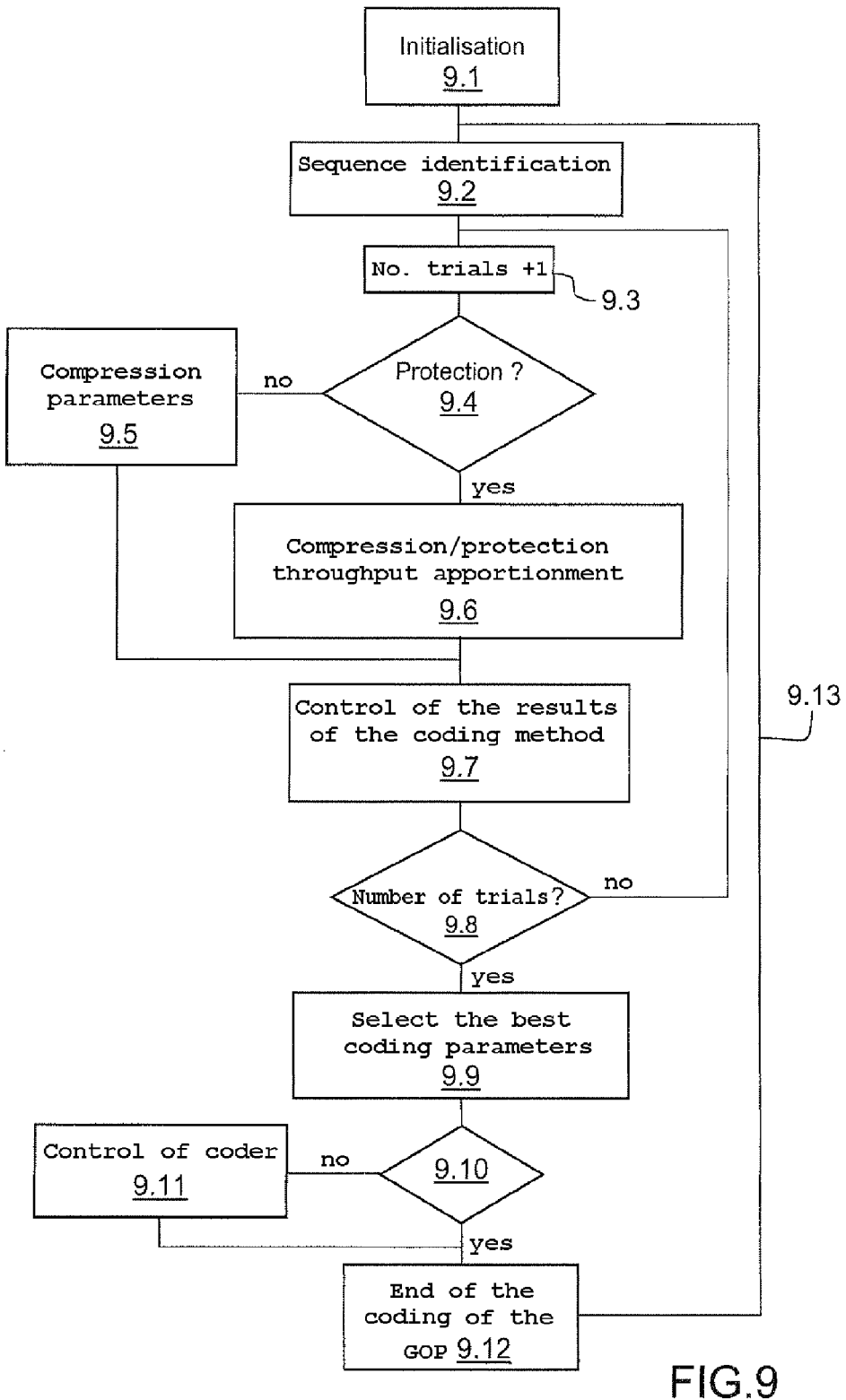
Figure 10:
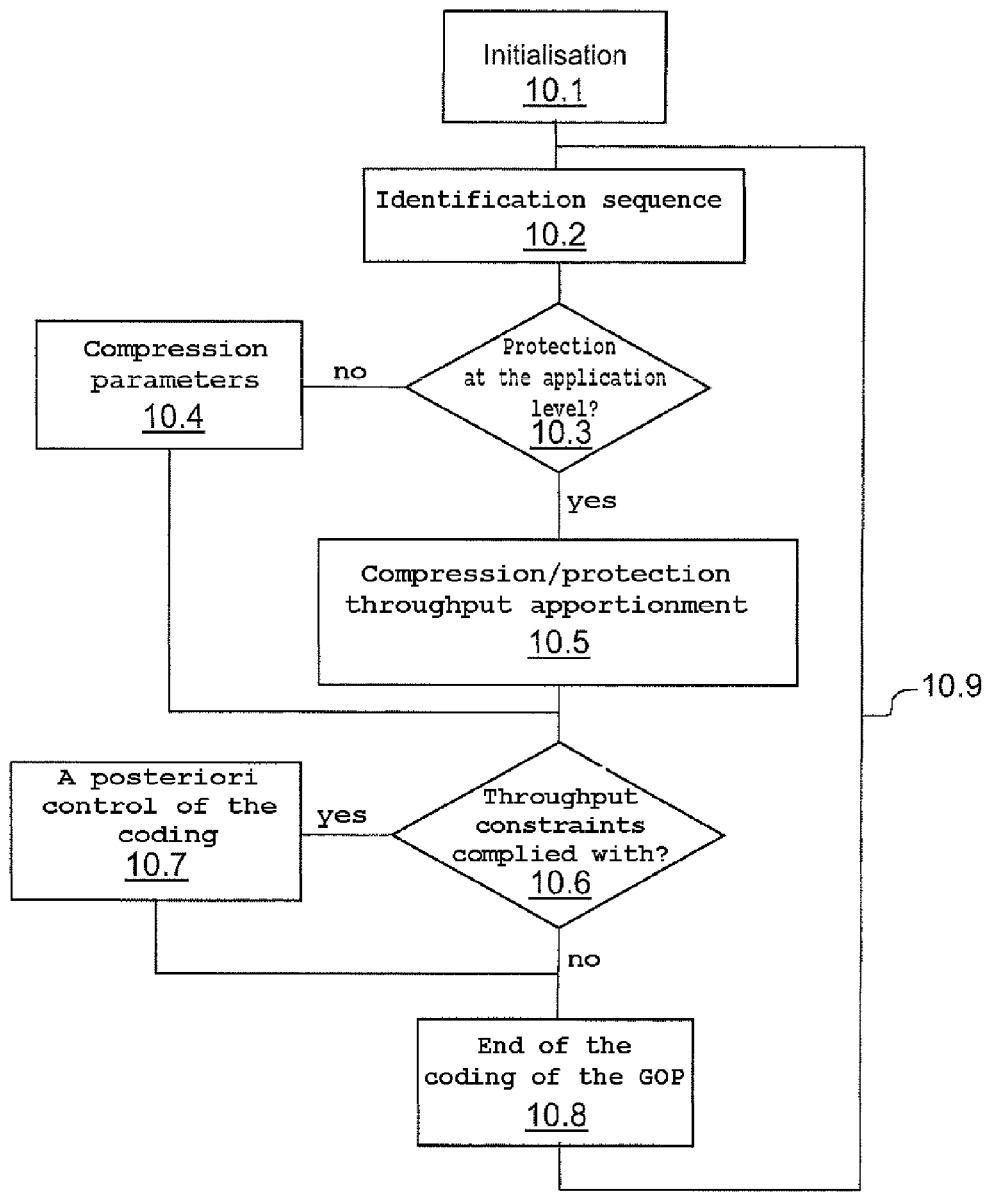

FIG. 9 presents the complete flowchart of this mode of operation.

Step 9.1 Initialization:

Take the default values for the compression parameters and the feedback information about the state of the transmission Step 9.2 Sequence Identification:

On the basis of the last {n} pairs (throughput, QP), identify the most probable throughput curve (C) for the current sequence Step 9.3 Nb Trials+=1

Step 9.4 Does protection need to be introduced at the application level?

NO

Step 9.5 Compression Parameters:

As a function of the available throughput, select the pair (throughput, QP) on the curve (C) which best corresponds to the throughput and video quality constraints.

Select the corresponding parameters and trigger the coding method.

YES

Step 9.6 Compression/Protection Throughput Apportionment:

For each degree of protection, select a collection (S) of pairs (throughput, QP) on the curve (C) making it possible to comply with the throughput constraints.

For each element of (S), predict the length of the GOP and the distortions corresponding to the frame losses (Dloss) and deduce therefrom the video measure, estimated on reception, of the $PSNR_{gop}$ of the GOP, compare this value with the best current value PSNR.

Select the best $PSNR_{gop}$ and trigger the method for coding the data with the corresponding coding parameters (compression, protection).

Step 9.7 Control of the Result of the Coding Method:

Store the real current value of the pair (throughput, QP) and compare it with the curve (C). If there is no correspondence, determine the new best curve (Cgop) for the current GOP and update as a function of the value (C).

Conversely, if the pair of current values (throughput, QP) satisfies the constraints, set the number of trials to MAX.

Step 9.8 has the Maximum Number of Trials been Reached, is it Greater than a Predetermined Value?

NO then return to step 9.3

YES

Step 9.9 Select the Best Coding Parameters:

From among the pairs of real values (throughput, QP) and their corresponding protection, search for the best combination which complies with the constraints and if said combination exists, trigger the method for coding the data with the corresponding coding parameters (compression, protection). In the converse case, undertake the refinement, if necessary, of the choice of the best coding parameters according to the applicable scheme (barycenter or the closest value of QP+/−1) and trigger the method for coding the data with the coding parameters (compression, protection).

Step 9.10 does the Coding Process Comply with the Constraints?

NO

Step 9.11 A Posteriori Control of the Coding:

Limit the throughput used to a maximum value+margin either by inserting a QP control within the coder, or by post processing by deleting the frames which lead to the limit of the throughput+margin being exceeded.

YES

Step 9.12 End of the Coding of the GOP:

Send the packets generated

Store the real current value of the pair (throughput, QP) in the list of previous pairs (throughput, QP)

If there is any, read the new feedback information about the state of the transmission.

Step 9.13 Control Operation for the Next GOP

Blind Mode

It is important to understand that the term "blind" refers to the fact that the controller is not aware of the future, and not that it has no information. Manifestly a controller with strictly no information in terms of throughput available for transmission, of knowledge of the transmission conditions or of the multimedia coder itself could not simply offer something different from the default parametrization, which has little chance of actually being close to the optimum for transmission.

In practice therefore, in the "blind" mode the controller has information about the transmission conditions but also possesses statistical information about the video coding. It is even possible for it to have some knowledge about the choice of the previously coded steps (parameters employed and results obtained with these parameters, in terms of throughput and quality $D_o$). Naturally the multimedia data vary over time, thus signifying that the parameter settings may no longer be representative of the current datum to be transmitted, rendering the second step of the adaptation mentioned (post-processing operation with cuts) hereinabove still more necessary.

As in the "partial and trials" mode, the "blind" method will rely on the statistical knowledge of the video codec so as to ensure that the parameters are not totally unrealistic. Choosing the parameters such as the initial QP without minimum precautions may in fact lead to poor results for the first GOP.

Step 10.1 Initialization:

Take the default values for the compression parameters and the feedback information about the state of the transmission Step 10.2 Sequence Identification:

On the basis of the last {n} pairs (throughput, QP), identify the most probable throughput curve (C) for the current sequence Step 10.3 Does Protection Need to be Introduced at the Application Level?

NO

Step 10.4 Compression Parameters:

As a function of the available throughput, select the pair (throughput, QP) on the curve (C) which best corresponds to the throughput and video quality constraints. Select the corresponding parameters and trigger the coding method.

YES

Step 10.5 Compression/Protection Throughput Apportionment:

For each degree of protection, select a collection (S) of pairs (throughput, QP) on the curve (C) making it possible to comply with the throughput constraints.

For each element of (S), predict the length of the GOP and the distortions corresponding to the frame losses ($D_{loss}$) and deduce therefrom the video measure, estimated on reception, of the $PSNR_{gop}$ of the GOP, compare this value with the best current value PSNR.

Select the best $PSNR_{gop}$ and trigger the method for coding the data with the corresponding coding parameters (compression, protection).

Step 10.6 During the Coding Method, Verify Whether the Stream Produced Complies with the Throughput and the Constraints on Margins?

YES

Step 10.7 A Posteriori Control of the Coding:

Limit the throughput used to a maximum value+margin either by inserting a QP control within the coder, or by post processing by deleting the frames which lead to the limit of the throughput+margin being exceeded.

NO

Step 10.8 End of the Coding of the GOP:

Send the packets generated

Store the real current value of the pair (throughput, QP) in the list of previous pairs (throughput, QP)

If there is any, read the new feedback information about the state of the transmission.

Step 10.9 Control Operation for the Next GOP

Extension Allowing the Comparison of Various Coding Modes: Normal, Data Partitioning and Frame Mixing As mentioned previously, the various algorithms presented may be employed either with a "normal" coding mode, that is to say for the most customary case of compression, with Intra, Predicted and optionally Bidirectional frames, or with a mode allowing data partitioning (for example the DP mode of the H.264 standard forming part of the extended X profile) which makes it possible to separate the data according to their importance in respect of reconstruction or else according to the frame mixing mode (FS) defined in the Applicant's patent application EP 1 779 689 or the publication by THALES [3] as long as the mode in question possesses its collections of charts.

A simple extension of the patent therefore consists in calculating the results obtained for two or more of these configurations during the phase of "apportionment of the throughput between compression and protection", and in choosing the best mode. In practice other constraints may be introduced to prevent overly frequent mode changing.

FIGS. 11 to 17 Illustrate Various Trials Performed by Means of the Method According to the Invention.

The simulations presented hereinbelow have been carried out for on the one hand the "total" operating mode and on the other hand the "partial and trials" operating mode. In both cases, it has been possible to observe gains of several dBs on average, with respect to the case without adaptation (use of the default parameters).

The "total" mode is clearly optimal, in the sense that complete knowledge of the compression possibilities is available, as well as statistical information about the state of the channel. Nonetheless, the system remains realistic in the sense that it remains causal; knowledge of the real channel not being available in advance (only statistical values are known).

Figure 11:
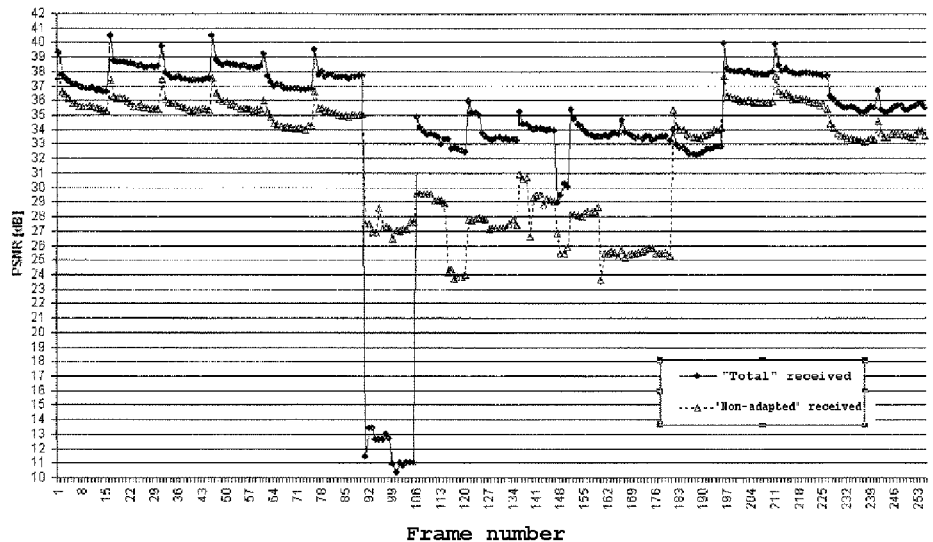

This mode may be compared with the case without adaptation, for which the compression and protection parameters are fixed with reference to a given operating point for the system. Naturally, the optimization is assumed to operate better, except in a few exceptional cases for which unexpected realizations of the channel may, by chance, favor the non-adapted case. FIG. 11 illustrates the gains obtained with this mode in the case of a Foreman ITU-T, QCIF, 15 Hz sequence, first 17 GOPs.

Figure 12:
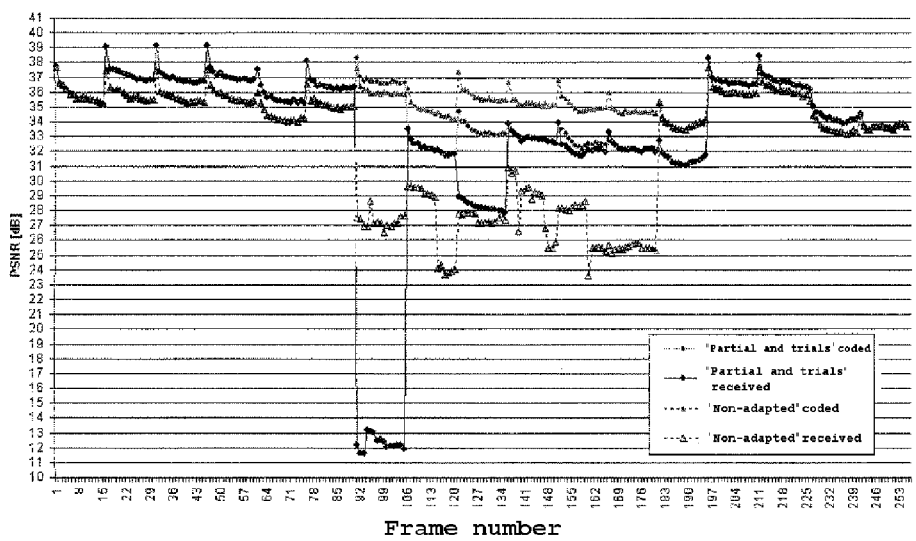
Figure 13:
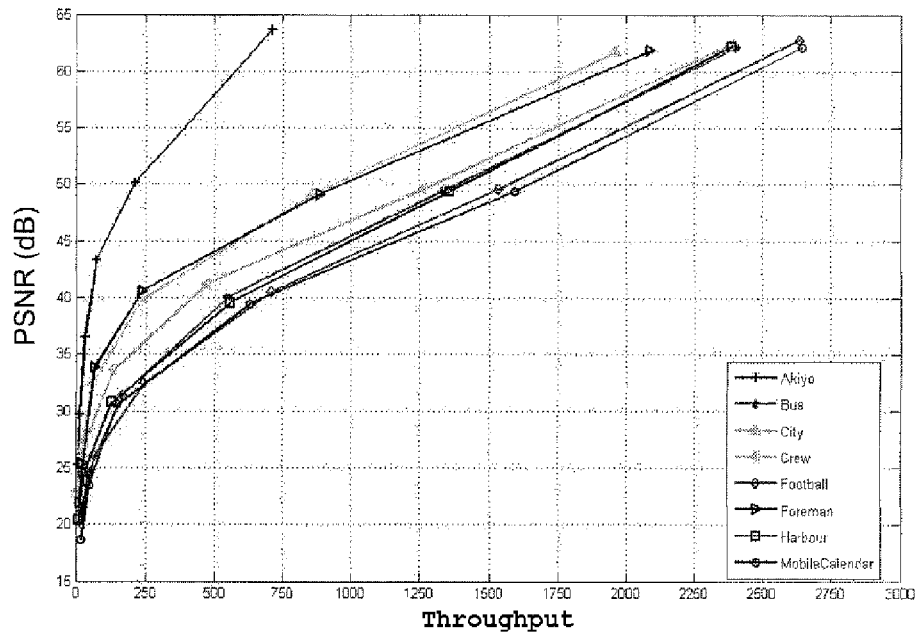

The "partial and trials" operating mode introduced in this patent may be compared on the one hand with the non-adapted mode described previously, and on the other hand with the "total" mode, which represents the maximum quality attainable on average, since it corresponds to the best possible prediction. The distance between the results of the "partial and trials" mode and of the "total" mode will make it possible to indicate to us the effectiveness of the prediction algorithm and has also enabled us to validate the definition of certain parameters such as the number of recommended tests. FIG. 12 illustrates the gains obtained with this operating mode. The example of the evolution in respect of the PSNR is given with a Foreman ITU-T, QCIF, 15 Hz reference sequence and first 17 GOPs.

In order to show the effectiveness of the proposed throughput control scheme, a few figures are given hereinafter by way of illustration.

Figure 14:
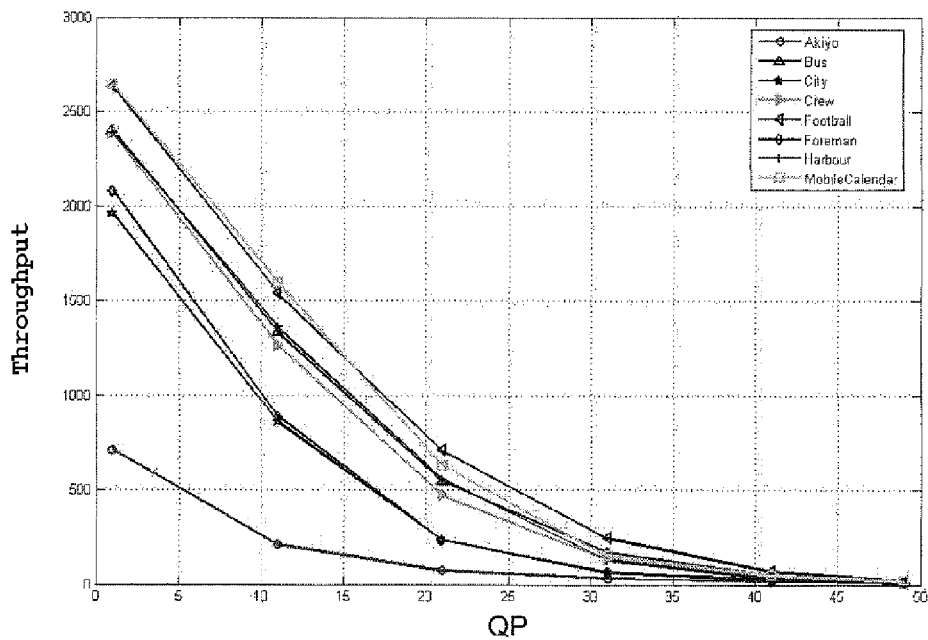
Figure 15:
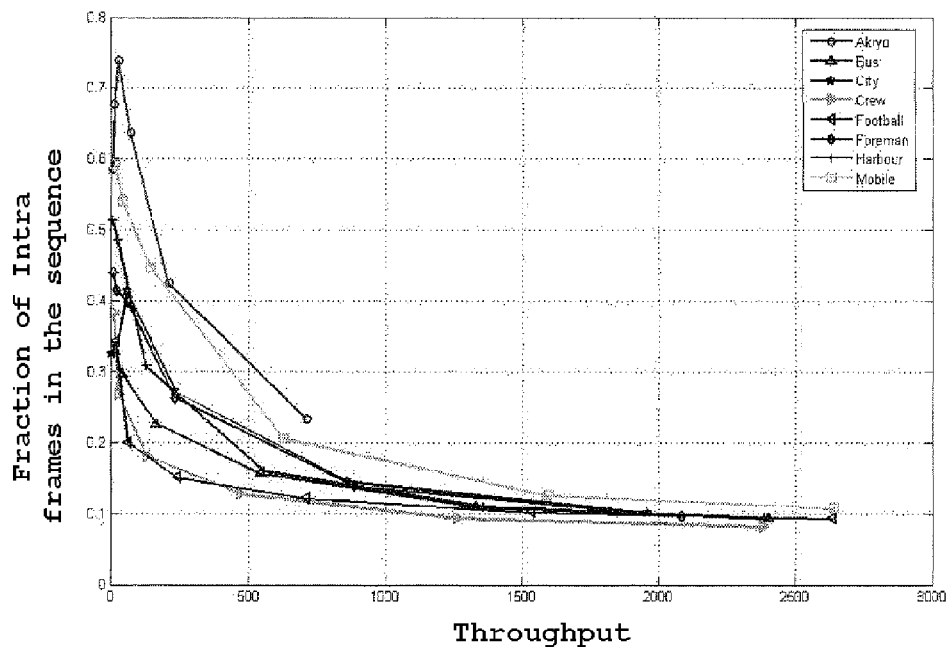

First of all, the charts which were used are provided in FIG. 14 and FIG. 15 for the expression for the PSNR (video quality) as a function of throughput and for the throughput as a function of the QP.

As mentioned previously, the information on the proportion of Intra frames in the sequences, which may be seen as a specific chart for the Intra, as illustrated in FIG. 16 and in FIG. 17, is also kept.

These charts make it possible to predict a precise target PSNR, as illustrated by FIG. 17.

The method and the system according to the invention exhibit notably the following advantages: to make it possible, in the more general case of making allowance for an erroneous channel, to carry out optimized apportionment of the available throughput between the compression, and to add protection by virtue of the dual prediction of the video throughput and of the impact of the errors.

REFERENCES

[1] M. G. Martini, M. Mazzotti, C. Lamy-Bergot, J. Huusko and P. Amon, "Content adaptive network aware joint optimization of wireless video transmission", *IEEE Communications Magazine*, pp. 84-90, January 2007.

[2] C. Bergeron and C. Lamy-Bergot, "Modelling H.264/AVC sensitivity for error protection in wireless transmissions", Proceedings of the *International Workshop on Multimedia Processing* (MMSP'06), pp. 302-305, Victoria, Canada, October 2006.

[3] C. Bergeron, C. Lamy-Bergot, G. Pau and B. Pesquet-Popescu, *Temporal Scalability through Adaptive M-Band Filter Banks for Robust H.264/MPEG-4 AVC Video Coding*, EURASIP Journal on Applied Signal Processing 2006 (2006), Article ID 21930, 11 pages.

[4] ITU-T and ISO/IEC JTC 1, Advanced video coding for generic audio-visual services, ITU-T Recommendation H.264 and ISO/IEC 14496-10 (MPEG-4 AVC), Version 1: May 2003.

[5] C. Bergeron and C. Lamy-Bergot, "Compliant selective encryption for H.264/AVC video streams", *Proc. Int. Workshop on Multimedia Processing (MMSP'05)*, pp. 477-480, Shanghai, China, October-November 2005.

[6] J. Hagenauer, "Rate-compatible punctured convolutional codes (RCPC codes) and their application," in *IEEE Trans. on Comm.*, vol. 36, n. 4, pp. 339-400, April 1988.

The invention claimed is:

1. A method for optimizing a video transmission in a constrained environment, video data being transmitted through a channel with errors or losses, throughput of the data transmission channel being finite, wherein a video coder is configured to code the video data to be transmitted, said method comprising:
    determining one or more compression parameters for the video coder that transmits said video data at a predetermined throughput Di and a predetermined quality Qi by:
        defining reference charts for said video coder based on reference video data, the reference video data being different from the video data to be transmitted, the reference charts comprising a QP throughput chart representation and a QP peak signal-to-noise ratio chart representation;
        predicting, for part of the video data undergoing compression and based on said reference charts, compression parameters, the compression parameters comprising a quantization interval QP based on one of the QP throughput chart representation and the QP peak signal-to-noise ratio chart representation, and a targeted range of throughput Di or quality Qi, closest in distance to said part of the video data to be compressed, while complying with a given margin;
        updating the predicting to converge on optimized compression parameters, said updating comprising compressing and verifying the part of the video data undergoing compression; and
    compressing the video data to be transmitted based on said determined compression parameters.

2. The method as claimed in claim 1, further comprising protecting against transmission errors by determining protection parameters based on the data transmission channel.

3. The method as claimed in claim 1, further comprising post processing the video data after the compression of the video data to be transmitted.

4. The method as claimed in claim 1, wherein the video data to be transmitted are a group of pictures, and wherein, in a total mode, a controller has knowledge of throughput for various coding configurations and relative proportions of various parts of the video data to be transmitted, the method further comprising:
  initializing by receiving default values for the compression parameters and feedback information about the state of the transmission;
  reading, for each available realization of incoming group of pictures, throughput QP information to obtain an accurate real curve C of throughput for a next group of pictures of the current video data;
  determining whether protection is to be introduced at an application level;
  if no protection is to be introduced at the application level:
    selecting, as a function of available throughput, a throughput QP pair on the curve C which corresponds to the throughput and video quality constraints; and
    selecting the corresponding compression parameters and triggering the coding method;
  if protection is to be introduced at the application level:
    selecting, for each degree of protection, a collection S of throughput QP pairs on the curve C that comply with the throughput constraints; and
    predicting, for each element of S, a length of the group of pictures and distortions corresponding to frame losses Dloss, deducing a video measure, estimated on reception, of the $PSNR_{gop}$ of the group of pictures, and comparing the $PSNR_{gop}$ with an optimal current value peak signal-to-noise ratio; and
    selecting an optimal $PSNR_{gop}$ and triggering the method for coding the video data with the corresponding compression parameters and protection coding parameters;
  ending the coding of the group of pictures by:
    sending packets generated;
    storing a real current value of the throughput QP pair in a list of previous throughput QP pairs; and
    reading any new feedback information about the state of the transmission; and
  controlling operation for a next group of pictures.

5. The method as claimed in claim 1, wherein the video data to be transmitted are video data traveling within a transmission channel, the method further comprising:
  initializing by taking default values for the compression parameters and feedback information about the state of the transmission;
  identifying, based on the last n throughput QP pairs, a throughput curve C for the current video data;
  setting the number of trials to one;
  determining whether protection is to be introduced at the application level;
  if no protection is to be introduced at the application level:
    selecting, as a function of available throughput, a throughput QP pair on a curve C which corresponds to the throughput and video quality constraints; and
    selecting the corresponding compression parameters and triggering the coding method;
  if protection is to be introduced at the application level:
    selecting, for each degree of protection, a collection S of throughput QP pairs on the curve C that comply with the throughput constraints; and
    predicting, for each element of S, a length of the group of pictures and distortions corresponding to frame losses Dloss, deducing a video measure, estimated on reception, of the $PSNR_{gop}$ of the group of pictures, and comparing the $PSNR_{gop}$ with an optimal current value peak signal-to-noise ratio; and
  selecting an optimal $PSNR_{gop}$ and triggering the method for coding the video data with the corresponding compression parameters and protection coding parameters;
  controlling a result of the coding method by:
    storing a real current value of the throughput QP pair and comparing the real current value with the curve C, where, if there is no correspondence between the real current value and the curve C, determining a new optimal curve Cgop for the current group of pictures, and if there is correspondence between the real current value and the curve C, and if the pair of current throughput QP values satisfies the compression constraints, setting the number of trials to MAX;
  determining whether the maximum number of trials been reached and whether the number of trials is greater than a predetermined value;
  if the number of trials is less than the predetermined value, setting the number of trials to one;
  if the number of trials is greater than the predetermined value, selecting the coding parameters;
  if the maximum number of trials has been reached and is greater than a predetermined value:
    selecting, from among the pairs of throughput QP real values and corresponding protection coding parameters, a combination that complies with the constraints and, if said combination exists, triggering the method for coding the video data with the corresponding compression parameters and protection coding parameters, and, if said combination does not exist, refining the coding parameters based on an applicable scheme, and triggering the method for coding the video data with the compression parameters and protection coding parameters;
  determining whether the coding process complies with the constraints;
  if the coding process does not comply with the constraints:
    limiting the throughput used to a maximum value plus a margin either by inserting a QP control within the video coder, or by post processing by deleting frames that lead to the throughput plus the margin being exceeded,
  if the coding process does comply with the constraints:
    sending packets generated;
    storing a real current value of the throughput QP pair in a list of previous throughput QP pairs; and
    reading any new feedback information about the state of the transmission; and
  controlling operation for a next group of pictures.

6. The method as claimed in claim 5, wherein the number of trials is less than or equal to 3.

7. The method as claimed in claim 1, wherein the video data to be transmitted take the form of a grouping of images, and the method further comprising:
  receiving default values for the compression parameters and the feedback information about the state of the transmission;
  identifying, based on the last n throughput QP pairs, a throughput curve C for the current sequence;
  determining whether protection is to be introduced at the application level;
  if no protection is to be introduced at the application level:
    selecting, as a function of the available throughput, the throughput QP pair on the curve C which corresponds to the throughput and video quality constraints; and selecting the corresponding parameters and triggering the coding method, if protection is to be introduced at the application level:

selecting, for each degree of protection, a collection S of throughput QP pairs on the curve C that comply with the throughput constraints;

predicting, for each element S, a length of the group of pictures and distortions corresponding to frame losses $D_{loss}$, deducing a video measure, estimated on reception, of the $PSNR_{gop}$ of the group of pictures, and comparing the $PSNR_{gop}$ with an optimal current value peak signal-to-noise ratio; and selecting an optimal $PSNR_{gop}$ and triggering the method for coding the video data with the corresponding compression parameters and protection coding parameters;

determining whether the video data produced complies with the throughput and the compression constraints;

if the video data produced complies with the throughput and the compression constraints:

limiting the throughput used to a maximum value plus a margin either by inserting a QP control within the video coder, or by post processing by deleting frames that lead to the throughput plus the margin being exceeded, if the video data produced does not comply with the throughput and the compression constraints;

ending the coding of the group of pictures by:

sending packets generated;

storing a real current value of the throughput QP pair in a list of previous throughput QP pairs; and reading any new feedback information about the state of the transmission; and controlling operation for a next group of pictures.

8. The method as claimed in claim 5, wherein the coding is carried out using the compression parameters and protection parameters to be used for the coding operations, the method further comprising post-processing by cutting off one or more frames having the least impact on the video data.

9. The method as claimed in claim 8, wherein the post processing is executed at the level of the video coder, the video coder being a H.264/AVC coder, by inserting artificially empty frames.

10. The method as claimed in claim 4, wherein an error-correcting code is a rate-compatible punctured convolutional code.

11. A system for optimizing a video transmission in a constrained environment, the system comprising:

a video coder configured to code video data to be transmitted, the video data being transmitted via a communication channel, and at least one processor configured to execute the method according to claim 1.

12. The method as claimed in claim 7, wherein the coding is carried out using the compression parameters and protection parameters to be used for the coding operations, the method further comprising post-processing by cutting off one or more frames having the least impact on the video data.

* * * * *